United States Patent [19]

Kreft et al.

[11] Patent Number: 4,496,115
[45] Date of Patent: Jan. 29, 1985

[54] RATCHET SPRING

[75] Inventors: John R. Kreft; Elvis W. Moss, both of Tulsa, Okla.

[73] Assignee: Brunswick Corporation, Skokie, Ill.

[21] Appl. No.: 439,367

[22] Filed: Nov. 4, 1982

[51] Int. Cl.³ .................. A01K 89/01; A01K 89/02
[52] U.S. Cl. .................... 242/84.1 R; 242/84.51 A
[58] Field of Search .............. 242/84.2 R, 84.2 A, 242/84.21 R, 84.21 A, 84.51 R, 84.5 A, 219, 242/84.1 R

[56] References Cited

U.S. PATENT DOCUMENTS 2,558,896 7/1951 Young et al. ............. 242/84.51 A
3,416,746 12/1968 Hull ........................ 242/84.5 R
4,378,914 4/1983 Shackelford et al. ...... 242/84.5 A Primary Examiner—Billy S. Taylor Attorney, Agent, or Firm—Wood, Dalton, Phillips, Mason & Rowe

[57] ABSTRACT

A ratchet spring for a spinning reel engageable with a line-carrying spool to produce an audible clicking noise to alert the user that line is being withdrawn from the spool. The spring comprises a first portion secured to a deck plate and a second portion diverging angularly from the first portion, away from the deck plate and toward the spool. The second portion is flexible towards and away from the deck plate. A V-shaped portion extends from the second portion, with the V opening towards the deck plate such that the apex of the V rides over the serrations as the spool is rotated, to produce the clicking noise. A portion of the spring has a protrusion with a tab formed thereon. The protrusion is introduced within an opening in the deck plate and when fully extended therewithin, engages the tab behind a shoulder on the deck plate to secure the ratchet spring to the deck plate.

4 Claims, 4 Drawing Figures

RATCHET SPRING

TECHNICAL FIELD

This invention relates to a fishing reel and, more particularly, relates to a fishing reel incorporating a unique ratchet spring to alert a user that line is being withdrawn from the reel.

BACKGROUND ART

Various methods have been devised to alert the user of closed-face spinning type reels that line is being withdrawn. Because a cover is disposed over the line-carrying spool, rotation of the spool cannot be visibly detected.

Exemplary of the art is a reel that incorporates serrations on a flange of the spool. A spring-type member is generally formed integrally with another reel element, as for example, a drag plate, which is otherwise rigid. The spring member coacts with the serrations on the spool to make an audible noise, indicating that rotation of the spool is occurring.

Such an arrangement has numerous drawbacks. First of all, the particular element incorporating the spring member becomes unnecessarily complicated to fabricate. Additionally, when the spring member is appended to another element, it generally cannot be used interchangeably with different reels. The result is that production costs are increased in that the element incorporating the spring member must be individually designed and separately manufactured for each reel.

As an alternative, a separate assembly might be devised to mount a ratchet arrangement. This generally requires additional parts, substantial modification of the reel and additional steps to assemble. The manufacturing costs are necessarily elevated.

The present invention is directed to overcoming the problems enumerated above.

DISCLOSURE OF THE INVENTION

The present invention comprises a ratchet spring for a fishing reel engageable with annularly disposed serrations on the face of a line carrying spool to produce an audible clicking noise to alert the user that line is being withdrawn from the spool.

The ratchet spring, in accordance with the present invention, can be simply and cheaply constructed and press fit by hand or by a hand operated press into assembled relationship on the reel, without the use of special tools or special fasteners.

In a preferred form, the spring is manufactured in one piece by stamping, molding or forming. The spring has first and second spring portions angled relative to each other about a fold line. The first portion is secured to the deck plate, while the second portion diverges away from the deck plate to engage the serrations on the spool. The spring has an arcuate bend in the plane of the spring so as to accommodate the spring for use in many different size and style reels.

To mount the spring, a mounting portion is provided adjacent the first portion and includes doubled over legs to form a loop, with one leg of the loop having a tab lanced or struck therefrom. The loop is pressed within an opening in the deck plate, engaging the tab behind a shoulder simultaneously as the first portion abuts the deck plate. Thus a person, by simply pressing the loop within the opening, can seat the tab, which, in cooperation with the first portion, contacts the wall of the deck plate to securely position the spring.

A V-shaped free end portion extends beyond the second portion, with the V opening towards the deck plate and the apex of the V engaging the serrations. With the serrations formed as radially extending slots on the spool, which may be square in cross-section, the V will make the desired click with the spool rotated in either direction. This prevents damage to the spring as might otherwise result if the spool was reversely rotated so as to catch the spring within one of the recesses of the serrations.

As can be seen, the ratchet spring can be used interchangeably with any reel as long as the V coincides with the serrations, with the spring positioned upon the deck plate. The spring will flex towards and away from the deck plate to accommodate variations in dimension between the deck plate and spool.

Various modifications and changes may be made with regard to the foregoing detailed description without departing from the spirit of the invention.

BEST MODE FOR CARRYING OUT THE INVENTION

Figure 1:
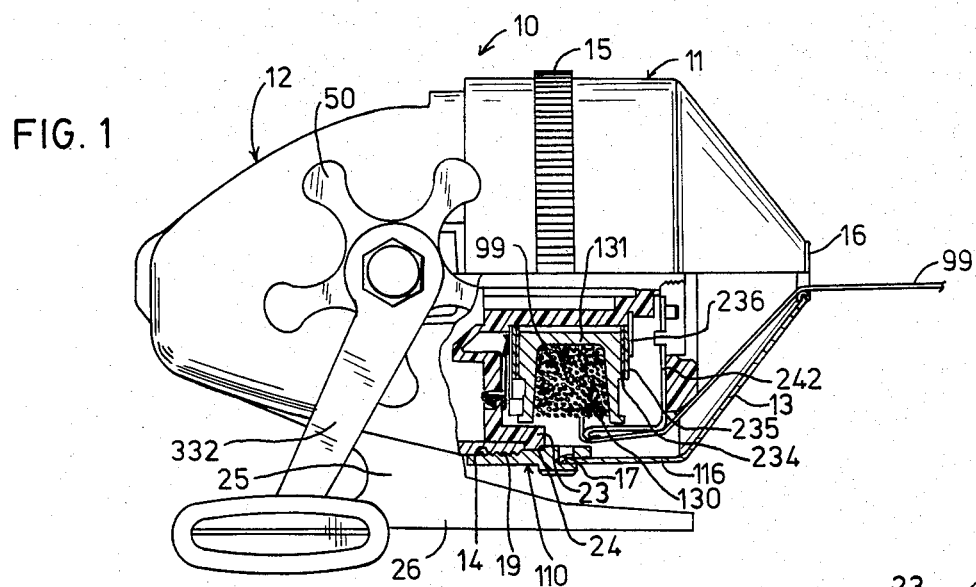
FIG. 1 is a side elevation view of a spin casting reel with the housing partially broken away and incorporating one preferred form of the ratchet spring.
Figure 2:
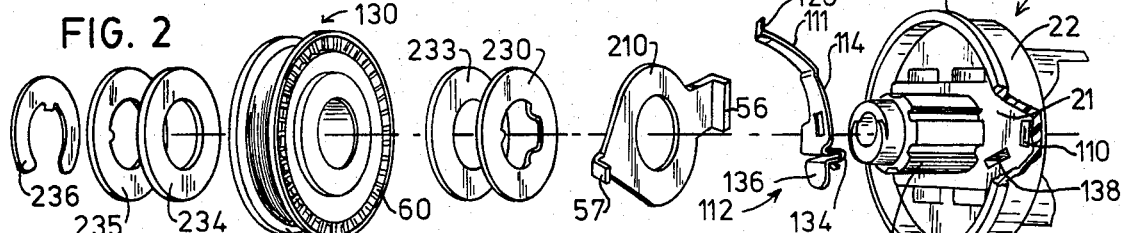
FIG. 2 is an exploded perspective view of a portion of the internal reel mechanism wherein the ratchet spring is assembled.

Referring initially to FIGS. 1 and 2, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The cone-shaped second part 11b has a generally annular rearward edge portion engaging in a forwardly facing locking groove 17 formed on the first part 11a of the cover 11. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

A reel body 20 is provided and includes a circular mounting plate or deck plate 21 which has a forwardly extending cylindrical sleeve portion 22 integrally formed around the outer periphery thereof. The forward edge of the sleeve 22 has a flange 23 extending radially outwardly beyond the outer surface of the sleeve portion 22. The cylindrical first part 11a of the front cover 11 is undercut forward of the internal thread 14 to provide a rearwardly facing shoulder 24 axially spaced from the end of the internal thread 14. The reel body 20 with the radially extending flange 23 is inserted in the opening of the rear cover 12 with the flange 23 bearing against the forwardly facing edge of the rear cover 12. The rear cover 12, which has on its forwardly facing end portion an external thread 19, is threaded into the internal thread 14 of the front cover 11 until the flange 23 on the reel body engages shoulder 24 in the undercut portion of the front cover to trap the reel body 20 between the front cover 11 and the rear cover 12. The rear cover 12 has an integrally molded, radially extending stem 25 with a mounting foot 26 on the outer end thereof for attachment of the reel to the appropriate part of a fishing rod. The mounting foot 26 is to be attached to the upper surface of a fishing rod for use.

A central hub 35 is carried by and projects forward of the deck plate 21 concentric with the sleeve 22 with a drag plate 210, back spool washer 230, back flat drag washer 233, spool assembly 130, front flat drag washer 234, and front spool washer 235, all retained on the hub 35 by a C-clamp 236. A spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16.

The drag plate 210 has an anchoring tab 57 located diametrically opposite a ramp 56 which engages a drag actuator (not shown), movably mounted rearward of the deck plate 21. The tab 57 engages in a recess 110 in the front surface of the deck plate 21. The drag actuator (not shown) is operated by a star wheel 50 to vary the pressure of the drag on the spool 130. Rotation of the wheel 50 in one direction increases drag by urging the drag plate forwardly so as to bear the back spool washer 230 and back flat drag washer 233 against the spool assembly 130. Rotation of the star wheel 50 oppositely to the one direction reduces the drag. A handle 332 is mounted externally of the star wheel 50 to operate the spool of the reel. Since the operation of the remainder of the reel mechanism is not essential to an understanding of the present invention, a detailed description of the same is omitted.

DESCRIPTION OF THE PREFERRED EMBODIMENT

The present invention resides in a ratchet spring 112 assembled with the deck plate 21 on the reel body 20 and engaging with a flange 61 at the rear portion of the spool 131. The details of the ratchet spring can be seen most clearly in FIGS. 2-4.

The spring 112 takes the shape, generally, of a crescent in the plane of the spring, with a flat first portion 114 that seats against the forwardly facing surface 116 of the deck plate 21. The curved configuration of the spring 112 accommodates the hub 35, centrally of the reel body 20.

A second portion 111 of the spring 112 is bent out of the plane of the first portion 114 about a primary fold line 118. The free end 120 of the spring 112 is bent substantially in the shape of a V, opening toward the deck plate 21. The V-shaped portion 120 comprises a third portion 126 of the spring 112 which diverges or angles at a second fold line 122 from the second portion 111 and away from the deck plate 21. The V-shaped portion has a fourth portion 128 of the spring 112 bent back towards the deck plate 21 at a third fold line 124 making a right angle with the third portion 126 of the spring. So configured, the apex 129 of the V, defined at the third fold line 124 is the furthest point of extension of the spring 112 from the deck plate 21.

The mounting portion or anchoring end of the spring 112 is indicated generally at 132, and is offset slightly from the curvature of the first portion 114. At the anchoring end 132 the spring 112 has a protrusion 134 extending out of the plane of the first portion 114 with a flange 136 turned back away from, and in the plane of, the first portion 114. To assemble the spring with the reel, a rectangular opening 138 is provided in the deck plate 21, through which the protrusion 134 is extended. The width of the opening 138 is chosen so that the sides 140,142 of the protrusion 134 are compressed towards each other when the protrusion is introduced so that the wedged sides 140,142 resist shifting of the spring. The length of the opening 138 is chosen to closely receive the spring width. The rectangular opening 138 has a major axis which is oreinted to coincide with the crosswise axis of the protrusion 134 so as to locate the V-shaped portion 120 of the spring in registry with the serrations on the spool as will be described hereinafter.

To prevent accidental escape of the spring 112 from the deck plate 21, a tab 144 extends outwardly of one side 140 or 142 of the protrusion 134. A counter bore 146 extends from the rear of the deck plate 21 around the opening 138, defining a shoulder 148 around opening 138 against which the upper edge 150 of the tab 144 abuts. The tab 144 will be compressed as the protrusion 134 is introduced and will spring outwardly from the side 140 or 142 simultaneously as the first portion 114 and the flange 136 of the spring abut the deck plate 21. As can be seen, assembly of the spring 112 requires only that the protrusion 134 be press fit, either by hand or with a hand press, in the opening 138 of the deck plate 21 remaining captive between the flange 136 and the tab 144.

Figure 4:
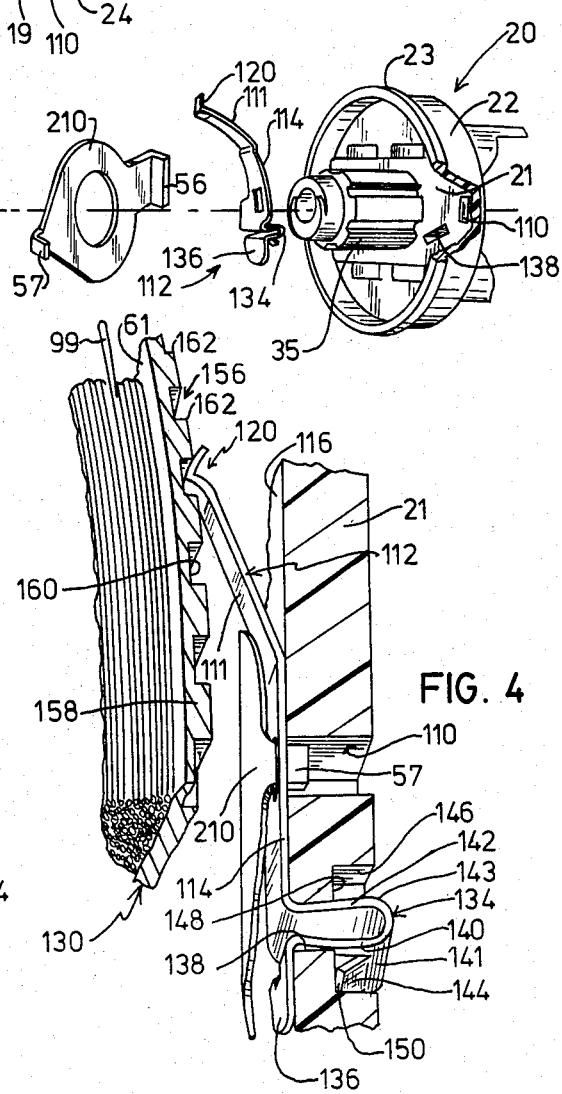
FIG. 4 is an enlarged, sectional view of the mounted ratchet spring engaged with a line-carrying spool.

A rectangular locating hole 154 in the first portion 114 of spring 112 aligns with the opening 110 in the deck plate 21 to permit access thereto by the tab 57 on the drag plate 210. The drag plate 210, as can be seen in FIG. 4, abuts the spring 112 and restrains the first portion 114 of the spring 112 from moving away from the deck plate 21 when the spool 130 is assembled and latched on the hub 35.

The V-shaped portion 120 of spring 112 coacts with annularly arranged serrations 60 on the axially facing surface of one flange 61 of the spool assembly 130. The serrations 60 are defined by a plurality of radially directed openings 156, each opening 156 preferably having a rectangular cross-section.

As the line 99 is withdrawn from the reel such as by catching a fish on the line or the like, the spool 131 is rotated relative to the spring 112. If the spool 131 is rotated slowly, the V of the spring will be guided over successive ridges 158 between openings 156 and flexed toward the deck plate. As the V intercepts each opening 156, the restoring force in the spring 112 directs the apex 129 sharply against the walls 160 defining the bottom of the openings 156, so as to make an audible click. If the spool is moved more rapidly, the third or fourth portions 126,128 of the spring 112, depending upon the direction of rotation, will rapidly and successively snap from contact with the corner 162 of the ridge 158 of one opening to the next corner of the next opening. As this occurs, a clicking noise can be heard by the operator, alerting him to the rotation of the spool. The restoring force in the spring tends to urge the V within the openings 156 and thereby locates the walls of the third or fourth spring portions 126,128 in a position to resist slightly the rotation of the spool. The V-shaped portion 120 of the spring as it snaps from opening to opening amplifies the sound of the address of the V to the ridges 158.

Preferably, the aforementioned fold line 118 is directed on a radial line from the center of the spool. This arrangement assures that as flexure occurs at the line 118, the V-shaped portion 120 will maintain a substantially constant orientation relative to the serrations 60.

In one modified form, the tab 57 on the drag plate 210 may fit into a slot in the deck plate 21 that does not necessitate the tab 57 passing through the locating hole 154 in the spring 112. In the just described structure, the body of the drag plate 210 still overlaps the portion 114 of the spring 112 to assist in holding the portion 114 against the deck plate whereupon the spring 112 maintains a proper functioning relationship.

The arc of the crescent of the spring 112 is such that one spring can be used in several different model reels. In some reels, the angle of the major axis of the aperture 138 in the deck plate may need to be changed slightly so that the V-shaped portion 120 will be in registry with the serrations 60 in the spool. In addition, the angle between portions 114 and 111 of the spring can be varied so as to allow use of the spring on even a wider variety of reels.

Figure 3:
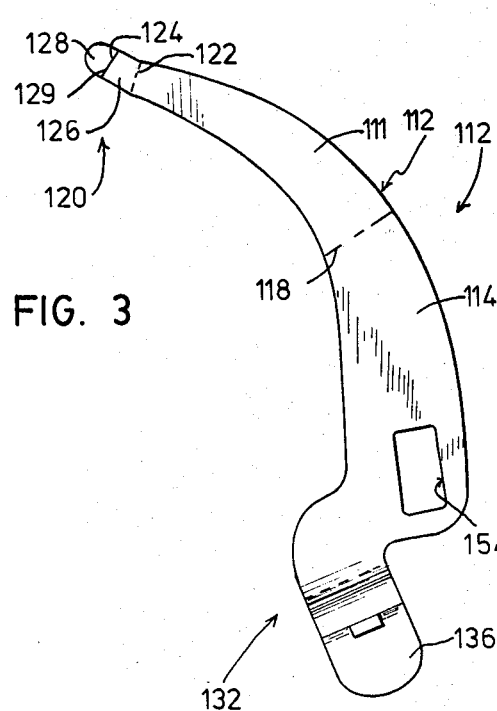
FIG. 3 is an enlarged view of the ratchet spring.

One operative example of a ratchet spring 112 made according to the invention is shown in FIGS. 2, 3 and 4 and has the spring 112 formed from a thin sheet of spring-type metal as by stamping or the like. The second portion 111 was formed out of the plane of the first portion 114 about the primary fold line 118 at an angle of approximately 25°. The V-shaped portion 120 has a third portion 126 of the spring angled at the second fold line 122 relative to the plane of the second portion 111 at an angle of approximately 25°. The protrusion 134 forming the anchoring end 132 of the spring 112 has the two sides 140,142 comprised of two legs 141 and 143 doubled back to back to form a U-shaped loop with the leg 141 being joined to flange 136. The legs 141 and 143 are bowed outwardly relative to each other so as to be wedged in opening 138 in the deck plate. A tab 144 is lanced or struck outwardly from one or the other leg 141,143 (as shown, it is leg 141). The spring 112 is assembled with the deck plate 21 by inserting the protrusion 134 in the opening 138 with the legs 141,143 being compressed as they pass into the opening 138. The tab 144 snaps into engagement with the shoulder 148 of the counter bore 146. The drag plate 210 is assembled with the deck plate 21 and spring 112 as described above. The V-shaped portion 120 of the spring 112 engages with the serrations 60 in the spool. With the reel assembled and in use, a very effective and reliable click indication of line pull out resulted.

It is contemplated that the spring 112 could be molded of plastic, could be derived from a wire form or the like. The angles between the respective first portion, second portion, third portion and the like can be varied as desired, all within the scope of the present invention. Various modifications and changes may be made with regard to the foregoing detailed description without departing from the spirit of the invention.

We claim:

1. In a fishing reel having a body with a deck plate having an opening therein, a line-carrying spool rotatable about an axis extending lengthwise of the fishing reel and a rearwardly facing surface on the spool with serrations arranged annularly about the surface, a ratchet spring comprising:

a first spring portion having a flat surface for engagement with the deck plate;

a second portion extending from the first portion angularly and away from the deck plate and toward the rearwardly facing surface of the spool, and movable relative to the first portion towards and away from the deck plate;

means on the first portion engaging within the opening in the deck plate to secure the ratchet spring relative to the deck plate, said means engaging the opening comprising a protrusion extending from the plane of the first portion and having outwardly disposed sides, the sides being press fit within the opening to anchor the ratchet spring relative to the deck plate, the second portion having means engaging the serrations such that upon rotation of the spool a clicking is audible as a result of the spring addressing the serrations to alert an operator of the reel that line carried on the spool is being withdrawn.

2. The ratchet spring of claim 1 wherein the deck plate has a shoulder facing away from the spool and the protrusion engaging within the opening comprises at least one tab extending angularly from one of the sides of the protrusion, the protrusion extending through the opening and the tab engages the shoulder to prevent the protrusion from escaping from the opening.

3. In a fishing reel having a body with a deck plate having a first opening therein, a line-carrying spool rotatable about an axis extending lengthwise of the fishing reel, a rearwardly facing surface on the spool with serrations arranged annularly about the surface and a drag plate having a tab engaging within a second opening in the deck plate, a ratchet spring comprising:

a first spring portion having a flat surface for engagement with the deck plate;

a second portion extending from the first portion angularly and away from the deck plate and toward the rearwardly facing surface of the spool, and movable relative to the first portion towards and away from the deck plate; and means on the first portion engaging with the first opening in the deck plate to secure the ratchet spring relative to the deck plate, the second portion having means engaging the serrations such that upon rotation of the spool a clicking is audible as a result of the spring addressing the serrations to alert an operator of the reel that line carried on the spool is being withdrawn, said ratchet spring having a locating hole to accommodate the drag plate tab, the drag plate abutting the ratchet spring and maintaining the first portion of the ratchet spring against the deck plate.

4. The ratchet spring of claim 1 wherein the first and second portions and the means engaging the opening are fabricated from a single piece of resilient sheet material.

* * * * *